April 20, 1954   D. W. BARKLEY   2,675,740
GLARE PREVENTING DEVICE AND METHOD FOR MAKING THE SAME
Filed Dec. 30, 1948   2 Sheets-Sheet 1
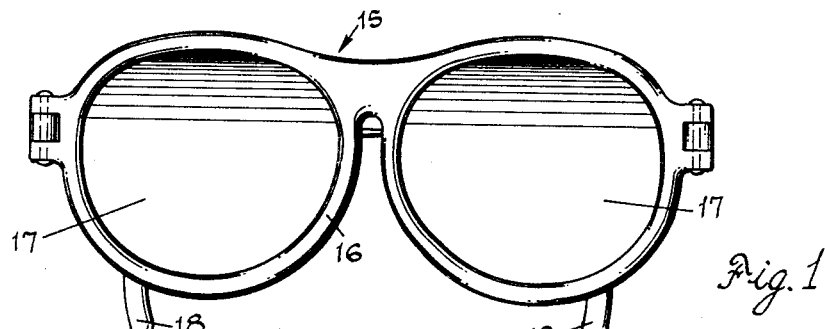
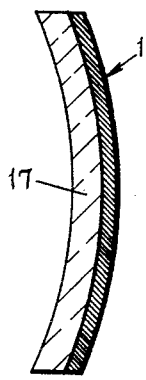 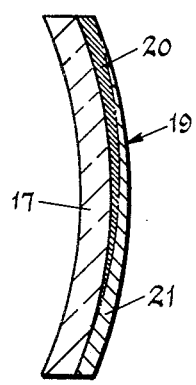 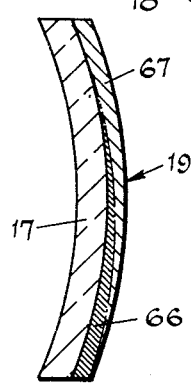 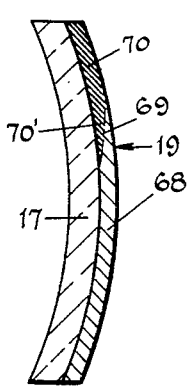
Fig. 2   Fig. 3   Fig. 4   Fig. 5
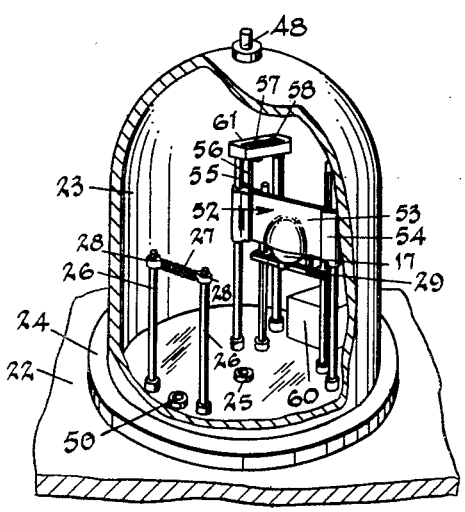 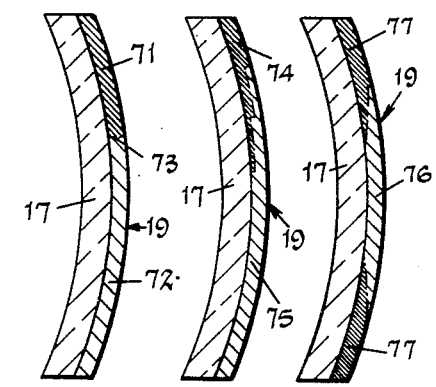
Fig. 9   Fig. 6   Fig. 7   Fig. 8
Inventor
Dwight W. Barkley
By Nobbe & Swope
Attorneys

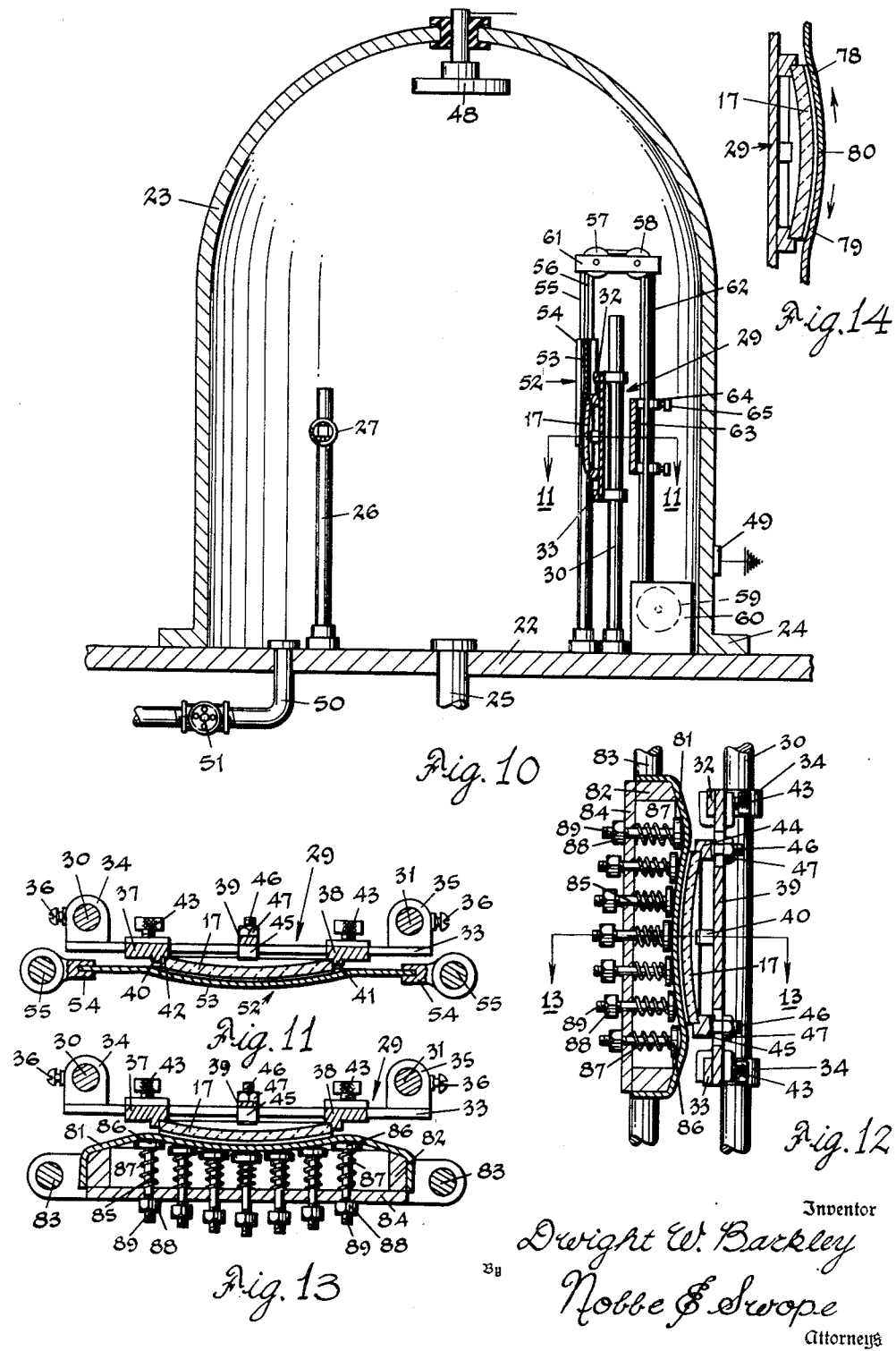

Patented Apr. 20, 1954

2,675,740

UNITED STATES PATENT OFFICE 2,675,740

GLARE PREVENTING DEVICE AND METHOD FOR MAKING THE SAME

Dwight W. Barkley, Cheswick, Pa., assignor to Libbey-Owens-Ford Glass Company, Toledo, Ohio, a corporation of Ohio Application December 30, 1948, Serial No. 68,204

9 Claims. (Cl. 88—108)

1

The present invention relates broadly to glare preventing devices and more particularly to anti-glare goggles, screens, and the like, and to a method and apparatus for producing the same.

By way of illustration, goggles made in accordance with this invention are intended to be worn by persons for protection against brilliant sunlight and glare and other annoying light conditions. For example, a person facing the sun, especially when traveling by water or across snow, is very likely to be annoyed by the brilliant glare therefrom. Also, the goggles herein provided are particularly suitable for use by the drivers of automotive vehicles for protecting the wearer from the annoyance and danger by glare from the headlights of automobiles traveling in the opposite direction.

An important object of the invention is the provision of goggles having special purpose lenses for eliminating the glare of abnormally bright rays of light from the eyes of the wearer.

Another object of the invention is the provision of an anti-glare goggle lens affording variant or graduated protection for the wearer in different portions thereof.

Another object of the invention is the provision of such a lens for protecting the eyes of the wearer from downwardly and/or upwardly inclined rays of light to a varying degree in different portions of the lens.

A further object of the invention is the provision of an improved method of and apparatus for producing the special purpose lenses herein provided in which a coating of light-absorbing material of uniform thickness is first applied over one surface of the lens, after which certain portions or areas thereof are treated in such a way as to alter or modify their physical and/or chemical characteristics whereby to render the coating of variable light transmission.

A further object of the invention is the provision of such a method and apparatus wherein a coating of oxidizable light-absorbing material of uniform thickness is first applied to one surface of the lens preferably by thermal evaporation, after which predetermined portions or areas of the coating are subjected to an electric glow discharge to cause oxidation of such portions or areas and thereby increase the transparency and light transmission thereof.

A still further object of the invention is the provision of such a method and apparatus wherein a shielding means for the lens movable with respect thereto controls the periods of exposure of predetermined portions or areas of the

2 coating to the glow discharge so that oxidation of said portions or areas may be regulated to give a uniform effect or a graded effect when a coating of variant density is desired.

Other objects and advantages of the invention will become more apparent during the course of the following description when taken in connection with the accompanying drawings.

In the drawings, wherein like numerals are employed to designate like parts throughout the same:

Fig. 1 is a front view of a pair of goggles equipped with special purpose lenses treated in accordance with the present invention;

Fig. 2 is a vertical sectional view of one of the lenses showing the light-absorbing coating as originally applied thereto;

Fig. 3 is a similar view of the lens after the coating has been subjected to the glow discharge;

Figs. 4 to 8, inclusive, are views similar to Fig. 3 but showing modified forms of the lens;

Fig. 9 is a perspective view of a vacuum chamber, partially in section, in which the lens may be treated;

Fig. 10 is a vertical sectional view through the vacuum chamber;

Fig. 11 is a horizontal sectional view taken substantially on line 11—11 of Fig. 10, illustrating one form of lens shielding means;

Fig. 12 is a vertical sectional view through a modified lens shielding means;

Fig. 13 is a horizontal sectional view taken substantially on line 13—13 of Fig. 12; and Fig. 14 is a further modified form of lens shielding means.

Referring now to the drawings, there is illustrated in Fig. 1 a goggle designated in its entirety by the numeral 15 and comprising a frame 16 of any desired design and material, transparent lenses 17, and temples 18, by which the goggle is supported with reference to the face of the wearer. As noted above, the goggles are intended for use in the protection of the wearer's eyes from brilliant sunlight and glare and analogous annoying light conditions, and to this end special purpose anti-glare lenses are provided. More particularly, each lens 17, which may be either of glass or plastic and clear or colored, is provided upon one surface, usually the front surface thereof, with a thin, oxidizable light-absorbing coating 19 to reduce the transmission of objectionable light rays therethrough. This coating may be deposited upon the lens in any suitable manner but preferably by high vacuum thermal evaporation to form a film of uniform thickness over the entire surface of the lens. After the coating 19 has been applied, certain predetermined or selected portions or areas thereof are subjected to an electric glow discharge to cause oxidation thereof and thereby render such treated portions or areas of increased transparency as compared with the untreated portions or areas.

The coating 19, which is applied over one entire surface of the lens 17, may consist of a metal, metal alloy, or other suitable oxidizable material, which is also light-absorbing to produce a coating of known density and light transmission in predetermined thicknesses. For example, the metal selected as the light absorbing coating may be aluminum, chromium, copper, nickel, the metal alloys known as "Monel" or "Inconel" as produced by the International Nickel Company, or any such metal or metal alloy which lends itself to oxidation in a high intensity glow.

Other suitable light-absorbing substances, which may be applied as coatings to provide light screening effects and which may be oxidized to vary the degree of residual light absorption in the lens, are such light-absorbing metal sulphides as lead sulphide, antimony sulphide, or stannic sulphide. Similarly, the blue oxide coatings of tungsten pentoxide or molybdenum pentoxide or the dark aluminum monoxide coatings may be employed as suitable screens since these are readily oxidized to higher oxides which are substantially transparent and colorless.

In general, the materials which are suitable for use in the forming of the coatings of this invention are characterized by the three properties of (1) providing partially transparent light-absorbing screens, the light absorption of which varies with the thickness of coating; (2) being a coating material which will readily oxidize in the glow discharge within low pressure oxygen containing atmosphere; and (3) of a character which, when so oxidized to an oxide, sulphate, or a higher oxide, will give a coating of increased transparency or lesser light absorption and preferably of little light absorption.

In accordance with the invention, the upper and/or lower portions of the lens coating 19 may be treated in such a way that oxidation thereof progressively increases toward the upper and/or lower edges of the lens to provide a variant density goggle. For example, in Fig. 3, the untreated portion of the coating 19 is indicated by the heavier cross sectioning 20 as shown in Fig. 2, while the treated or oxidized portion is indicated by the lighter cross sectioning 21. The untreated portion 20 of the coating 19 is thickest at the upper edge of the lens and progressively diminishes downwardly until it substantially disappears at or adjacent the lower edge of the lens. On the other hand, the treated portion 21 is thickest at the lower edge of the lens and gradually decreases upwardly in thickness and fades into the untreated portion 20 at or adjacent the upper edge of the lens. The untreated and treated portions 20 and 21 respectively thus created constitute distinct overlapping wedges of varying light transmission, with the area above the horizontal centerline of the lens being of reduced transparency as compared with the area below said centerline. As shown, the overlapping untreated and treated portions 20 and 21 respectively are substantially triangular in cross section so that the light transmission of the coating progressively increases from the upper edge of the lens to the lower edge thereof.

One form of apparatus which may be used for providing the coating of Fig. 3 is illustrated in Figs. 9, 10 and 11. This apparatus comprises a base 22 upon which is removably mounted a housing or bell-like casing 23 having at the lower end thereof a surrounding flange 24 which rests upon the top surface of the base 22. The base is, as shown, provided centrally thereof with an exhaust pipe or conduit 25 which is in communication with the chamber formed within the housing 23 and which is preferably connected with suitable pumps (not shown) for evacuating the chamber and creating the desired vacuum therein.

Located within the chamber and mounted upon the supporting base 22 is a pair of spaced, upright posts 26 between which is carried in substantially horizontal position an electric filament 27. The filament is in the form of a coiled wire made of tungsten, molybdenum, columbium, or tantalum, whose opposite ends are attached to brackets 28 mounted upon the supporting posts 26 and adjustable thereon to vary the position of the filament 27 with relation to the supporting base. As pointed out above, the originally applied coating 19 on the lens may be a metal, metal alloy, metal sulphide, or lower metal oxide which lends itself to oxidation in a high intensity glow. Small pieces of the material to be evaporated upon the lens are applied to the filament 27 as is well known in the art of high vacuum thermal evaporation.

The supporting means or work-holder for the lens 17 to be coated is also positioned within the housing 23 opposite the evaporating unit and is designated in its entirety by the numeral 29. This work-holder may take a variety of different forms but as herein shown comprises a pair of spaced vertical posts 30 and 31 upon which are mounted the upper and lower horizontal cross bars 32 and 33 respectively, each being provided at its opposite ends with collars 34 and 35 which slip over the posts 30 and 31 and are secured thereto by set screws 36. Extending between and carried by the horizontal cross bars 32 and 33 are two outer vertical strips 37 and 38 and a central vertical strip 39.

Carried by the outer strips 37 and 38, intermediate their upper and lower ends, are blocks 40 and 41 having notches 42 for receiving the adjacent side edges of the lens. The said strips 37 and 38 are adjustable horizontally relative to the horizontal cross bars 32 and 33 to clampingly engage lenses of different shapes and sizes and are secured in proper position by set screws 43. On the other hand, the central strip 39 carries adjacent its upper and lower ends similar blocks 44 and 45 which engage the upper and lower edges of the lens and are adjustable vertically to also accommodate lenses of different sizes. This adjustment may be accomplished by supporting the blocks 44 and 45 upon bolts 46 which pass rearwardly through vertical slots in the central strip 39 and are secured in adjusted position by nuts 47 threaded upon said bolts.

After the lens 17 has been properly secured upon the work-holder 29 and the pieces of metal or material to be evaporated are hung upon or applied to the filament 27, the housing 23 is positioned on the base 22 to enclose the work-holder and evaporating unit within the chamber. The chamber is then evacuated to create the desired vacuum therein, depending upon the metal being evaporated. The filament 27 is then heated by electric current until the metal or material is vaporized and the molecules transported to the lens to form the coating 19 of uniform thickness thereon.

Upon completion of the deposition of the coating 19 upon the lens, predetermined portions or areas of said coating are subjected to an electric glow discharge in oxygen containing atmosphere to cause oxidation of said portions or areas to increase the transparency thereof. To perform this operation, the evaporating apparatus is provided with insulated electrodes 48, preferably of aluminum or magnesium, and the wall of the chamber, if metal, may be used as one electrode as indicated at 49. The electrodes 48 and 49 are electrically energized by applying thereto 15,000 volt D. C. or A. C. or less to produce an electric glow discharge of sufficient intensity such for example as 3 kva., to effect the required oxidation of the coating within a given period. Prior to the operation of the glow discharge, however, it may be found desirable to alter the vacuum conditions within the chamber to a point at which a good electrical discharge can be maintained, such as within the range between 2 to .01 mm. For example, the vacuum within the chamber may be altered by the admission of a relatively small amount of air or oxygen to the chamber through pipe 50 upon operation of valve 51 to thereby produce the necessary oxygen containing atmosphere.

Also prior to operation of the glow discharge, a shielding means, designated in its entirety by the numeral 52, is arranged in front of the coated lens 17. This shielding means preferably comprises a flexible curtain or mask 53 which conforms substantially to the curvature of the lens if a curved lens is to be coated, and preferably contacts therewith to effectively protect the covered portions of the lens from the action of the high intensity glow. The curtain is secured at its marginal side edges to collars 54 which are slidable on vertically disposed rods 55, said rods being mounted on the base 22 and so located with reference to the work support 29 that the curtain will be movable along the surface of the lens.

The curtain 53 is movable upwardly or downwardly by cables 56 trained about pulleys 57 and 58 and attached at their opposite ends to a drum 59 rotated at a uniform rate or in a step by step fashion by suitable mechanism 60, such as clockwork or the like. This mechanism is preferably of a self-actuating type for operation within the evacuated chamber, although it may be adapted for actuation by means of external controls. The pulleys 57 and 58 are journalled in horizontal bars 61 attached to the upper ends of the rods 55 and to corresponding vertical rods 62 supported upon base 22.

In order to maintain the curtain 53 in close contact with the lens during glow discharge, and if the curtain is composed of a thin sheet of flexible metal, a magnet plate 63 may be mounted behind the lens, with the magnetic influence of said plate acting to attract the curtain and hold it in engagement with the lens. The magnet plate 63 can be carried at its opposite ends by collars 64 slidable on the rods 62 and held in adjusted position thereon by set screws 65.

In practice and during evaporation of the coating 19 upon the lens, the curtain 53 is raised or lowered to a position where it will not interfere with the appplication of such coating. After the coating has been applied and it is desired to place the glow discharge in operation, the curtain is moved to a position where it will cover the entire surface of the lens. Then, in order to treat the coating as in Fig. 2, the high intensity glow is started and the lower edge of the curtain moved upwardly to gradually expose the lens, whereupon successive areas of the coating will be exposed to the action of the glow discharge for progressively shorter intervals of time and thereby be progressively oxidized in the successively exposed areas to substantially lesser depths. The rate of upward movement of the curtain is so controlled that the treated portion 21 of the lens coating will be of diminishing cross section or thickness as the curtain approaches the upper edge of the lens. Since the oxidizing effect of the glow discharge will be in proportion to the speed of movement of the curtain, a wedge will be created as the period of penetration or exposure is lessened. In other words, the coating 19 will be oxidized to a varying depth, decreasing gradually from the bottom edge of the lens where it is oxidized throughout its thickness to the upper edge thereof where it fades into the untreated portion 20.

A reverse arrangement of the treated and untreated portions of the originally applied coating 19, secured by a gradual lowering of the curtain 53, is illustrated in Fig. 4. As herein shown, the untreated and therefore denser or more opaque portion 66 of the coating 19 is thickest at the bottom edge of the lens and tapers upwardly toward the upper edge thereof, with the treated and more transparent portion 67 being thickest at the upper edge of the lens and tapering downwardly toward the lower edge thereof. The denser areas of unoxidized coating provided in the lower portion of the lens reduce light transmission therethrough with a progressive increase in transparency as the residual unoxidized coating becomes thinner toward the upper edge of the lens. The density of the coating at the lower portion of the lens may be employed to protect the eyes of the wearer from objectionable light rays reflected from surfaces normally below the eye level such as snow and water glare.

In Fig. 5 the coating 19 is subjected to the glow discharge in much the same manner as in Fig. 3, except that the coating is oxidized throughout its depth as at 68 from the lower edge of the lens upwardly to a point above the horizontal centerline of the lens and then tapers off rather abruptly as at 69 to overlap the lower correspondingly tapered part 70' of the untreated portion 70, which takes the form of a relatively wide band across the upper portion of the lens.

In Fig. 6 the upper portion of the coating 19 is left untreated as at 71, while the lower portion 72 thereof is treated throughout its depth to give an abrupt break 73 between the treated and untreated portions.

In Fig. 7 the untreated portion of the coating 19 is indicated at 74 and the treated portion at 75. As herein shown, the treated portion above the horizontal centerline of the lens is of substantially a stepped formation, decreasing in thickness toward the top of the lens, and therefore the curtain 53 is given an upward step by step motion during the glow discharge. Thus, the lower portion of the lens will be exposed to the glow discharge for the longest interval of time and succeeding portions of the lens toward the upper end thereof will be subjected to the glow discharge for less and less intervals of time.

Upon reference to Fig. 8, it will be noted that the coating 19 is subjected to oxidation only at the horizontal central portion 76 thereof and that this oxidized area gradually decreases in thickness toward the upper and lower edges of the lens, the untreated portions being indicated at 77. To provide such a coating, a shielding means of the type illustrated in Fig. 14 may be employed. In this instance, two curtains 78 and 79 are used with the adjacent edges thereof meeting as at 80. When the glow discharge is placed into operation, the two curtains are moved in opposite directions, as indicated by the arrows, to initially expose the central portion of the coating and succeeding areas extending toward the upper and lower edges of the lens.

It will be appreciated that in all forms of the invention shown in Figs. 3 to 8, if the wearer should encounter an irritating light source which he normally would be forced to view, he may easily reduce the intensity of the light reaching his eyes by merely raising or lowering his head to bring either the upper or lower areas of reduced light transmission into his line of vision. It will of course be appreciated that the arrangement of the treated and untreated portions of the coating 19 in Figs. 5, 6 and 7 may be reversed if desired to place the untreated and therefore denser portion of the coating at the bottom of the lens.

A modified form of shielding means is illustrated in Figs. 12 and 13 which may be employed in forming the coatings in Figs. 3 to 8. Such means comprises a flexible curtain 81 carried by a supporting frame 82 slidable upon vertical posts 83. Extending through the rear wall 84 of the supporting frame 82 are a plurality of plungers 85 having head portions 86 which are pressed against the curtain 81 by springs 87. The compression of these springs may be adjusted by means of nuts 88 threaded upon the outer ends 89 of the plungers. A sufficient number of plungers are located in the frame to provide both vertically and horizontally constant pressure areas which maintain the curtain in complete coverage with the lens and permit the treatment of lenses of different curvatures.

Materials of which the shielding means is constructed should be such that sputtered metal particles will not be emitted from these during glow. By way of example, shields of aluminum or rubber may be employed.

From the foregoing, it will be seen that there is provided a new and novel glare preventing device and method of making a coating of graded transparency or light absorption qualities which may be usefully employed in goggles, screens, filters, or the like produced upon various transparent, smooth base materials such as clear glass, colored glass, or plastic. The resultant articles offer such wedge type films of variable density in a new type of combination in which the thin light absorption film at its thinnest edge or portions thereof is protected by an oxidized layer of material thereon. One of the weaknesses of wedge coatings has been that the thinnest part of the coatings has been subject to rapid wear and destruction in use. By the method of this invention an article is produced in which a hard protective film of transparent nature is directly formed over the thinner parts of the light absorption coatings during their formation. The completed articles are thus characterized by the presence of a hard metal oxide or sulphate film overlying and coextensive with the graded portion of the light-absorbing film and in intimate contact with the same, the thickness of the protective film being inversely thicker as the light-absorbing film is thinner. Thus, the protective oxidized film is of a thickness graded as to the need for protection of the underlying absorbing film and the two films together form a continuous coating of substantially uniform thickness, a portion of which has light-absorbing properties and a portion of lesser light absorption.

By way of illustrating the invention, a partially transparent coating 19 of chromium was applied to a lens, such as shown in Fig. 2, by thermal evaporation within a vacuum. With an originally applied chromium coating of 60 angstrom units thickness, the light transmission thereof was 20 percent. After treating the coating by glow oxidation, as herein described employing a movable shield or mask 53, so as to oxidize the chromium to progressively deeper thicknesses to the more transparent chromium oxide as shown in Fig. 3, the light transmission at the bottom of the lens was increased to 40 percent and the light transmission graded progressively from 40 percent at this point upwardly to 20 percent at the unaffected portion thereof. The glow oxidation was carried out for twenty minutes at the bottom of the lens and for progressively lesser times of application to the coating at the upper portions of the lens to secure the lesser depths of oxidation of the chromium. The glow oxidation was carried out in a vacuum containing oxygen at a pressure of .02 millimeter.

In another example of a graded film produced according to the invention, a glass lens, screen, or the like, originally provided with an aluminum coating 19 showing a light transmission of 8 percent and having a thickness of 20 Angstrom units, was progressively exposed to glow oxidation at a pressure of 0.1 millimeter for periods ranging up to a mixum of two hours, upon the portion from which the shield or mask 53 was first removed. The portion of the coating thus first exposed to the glow, which had a treatment for two hours, was found to have a light transmission of 15 percent, showing the conversion of the aluminum to a considerable depth to aluminum oxide. The film produced thus varied progressively from 8 percent light transmission in the untreated portions up to the 15 percent light transmission in the maximum treated area. The coating thus produced was of a neutral blue-gray color by transmission, with progressive changes in density in the various areas.

A third lens, screen, or the like, of varying neutral gray light-absorbing areas, may be produced, by way of example, which shows a graded light transmission of 8 to 16 percent. This may be prepared in the same manner as in the preceding example, by progressive glow oxidation of a thermally evaporated aluminum coating of 100 angstrom units thickness upon a transparent support.

By glow discharge at .015 millimeter in an air atmosphere for forty minutes, an Inconel coating on glass having an original light transmission of 10 percent was progressively oxidized employing a moving shield so as to produce a coating showing a variation from 10 per cent by light transmission to 13 percent by light transmission in the maximum treated area. A Monel metal thermally evaporated deposit on another piece of glass placed within the same chamber and exposed to the same glow discharge behind a moving shield showed a light transmission in the untreated area of 8 percent up to 9 percent in the maximum treated area.

As further examples, two screens were prepared by chemically depositing coatings of lead sulphide upon cleaned transparent glass sheets, the coatings being formed only upon one-half of each sheet and being of such thicknesses that the coated portions were a reddish yellow by light transmission. On one of the sheets the coated portion was of 16 percent light transmission and the remaining uncoated portion was clear. On the other sheet a somewhat heavier coating which transmitted only 6 percent of the light through the coated portion was employed. Each of the sheets were mounted vertically in a vacuum chamber with the clear portions downwards and with a closely fitting screen placed in front of the coated portions and arranged to move upwards during the glow oxidation step which followed. A glow oxidation for thirty minutes in the chamber at one millimeter pressure of air was given the coating while the moving screens traversed upwards progressively over one-half of the coated portions.

Thus, two screens were produced in which the clear bottom half portions were followed by a one-fourth coated portion of continuously varied light absorption and in which the top one-fourth portions were of the original unchanged light-absorbing qualities. In the one screen the graded portion varied from 19 percent to 16 percent light transmission, and in the other the graded portion showed a range from 7.5 percent to the original 6 percent, the lighter portions in each case being next to the clear uncoated areas. The coatings were partially changed by oxidation to the less light absorptive lead sulphate for a portion of the depth of the coating where the glow oxidation was allowed to act on the coating. Similar results were secured with lead sulphide coated screens where the lead sulphide was applied to the glass by thermal evaporation in a vacuum chamber.

It will of course be understood that for purposes of illustration, the coating 19 on lenses 17 in Figs. 3 to 8 inclusive, is shown on an exaggerated scale, having considerably greater thickness in comparison to the thickness that would be provided in actual use. Also, while the maximum treated portions of the graded coatings above described are shown in the drawings as being oxidized throughout the depth of the original coating 19, it will be understood that this oxidation may or may not extend completely through or only partially through the depth of the first applied light-absorbing coating 19, depending upon the type of coating, thickness of coating, the length of glow oxidation treatment, and the desired properties to be produced in the finished article.

I claim:

1. A glare reducing lens, screen, or the like, comprising a transparent support, and a coating applied to one surface of said support consisting of a film of light-absorbing material having a portion of graded thickness and light transparency and a film of an oxide of the material of the first film and of increased transparency, said second film being in intimate contact with the first film and overlying and coextensive with the graded portion thereof, the two films forming a continuous coating of substantially uniform thickness.

2. In the manufacture of glare reducing lenses, screens, or the like, the method comprising applying to one surface of a transparent support a coating of light-absorbing material of uniform thickness, and then treating a portion of said coating to render said portion of lesser light absorption and increased transparency.

3. In the manufacture of glare reducing lenses, screens, or the like, the method comprising applying to one surface of a transparent support a coating of oxidizable light-absorbing material of uniform thickness, and then subjecting a portion of said coating to a glow discharge to render it of lesser light absorption and increased transparency.

4. In the manufacture of glare reducing lenses, screens, or the like, the method comprising applying to one surface of a transparent support by evaporation, a coating of light-absorbing metal of uniform thickness, and then treating a portion of said metal coating to render it of lesser light absorption and increased transparency.

5. In the manufacture of glare reducing lenses, screens, or the like, the method comprising applying to one surface of a transparent support by evaporation, a coating of oxidizable light-absorbing metal of uniform thickness, and then subjecting a portion of said metal coating to an electric glow discharge to render it of lesser light absorption and increased transparency.

6. In the manufacture of glare reducing lenses, screens, or the like, the method comprising applying to one surface of a transparent support a coating of light-absorbing material of uniform thickness, then treating a portion of said coating to render said portion of lesser light absorption and increased transparency, and in moving a shield across the coated face of the transparent body during the treatment thereof to control the depth and extent of such treatment.

7. In the manufacture of glare reducing lenses, screens, or the like, the method comprising applying to one surface of a transparent support a coating of oxidizable light-absorbing material of uniform thickness, then subjecting a portion of said coating to glow discharge to render it of lesser light absorption and increased transparency, and in moving a shield across the coated face of the transparent body during glow discharge to control the extent and depth of oxidation thereof.

8. In the manufacture of glare reducing lenses, screens, or the like, the method comprising applying to one surface of a transparent support by evaporation, a coating of light-absorbing metal of uniform thickness, then treating a portion of said metal coating to render it of lesser light absorption and increased transparency, and in moving a shield across the face of the transparent body during the treatment thereof to control the depth and extent of such treatment.

9. In the manufacture of glare reducing lenses, screens, or the like, the method comprising applying to one surface of a transparent support by evaporation, a coating of oxidizable light-absorbing metal of uniform thickness, then subjecting a portion of said metal coating to an electric glow discharge to render it of lesser light absorption and increased transparency, and in moving a shield across the coated face of the transparent body during glow discharge to control the extent and depth of oxidation thereof.

References Cited in the file of this patent

UNITED STATES PATENTS

| Number | Name | Date |
|---|---|---|
| 1,095,543 | Barr | May 5, 1914 |
| 1,176,313 | Pfund | Mar. 21, 1916 |
| 1,206,132 | Otte | Nov. 28, 1916 |
| 1,245,606 | MacCurdy et al. | Nov. 6, 1917 |
| 1,419,725 | Fisher | June 13, 1922 |
| 2,252,770 | Jones | Aug. 19, 1941 |
| 2,259,395 | Sachtleben | Oct. 14, 1941 |
| 2,351,536 | Osterberg et al. | June 13, 1944 |
| 2,366,687 | Osterberg | Jan. 2, 1945 |
| 2,401,443 | Weinrich | June 4, 1946 |
| 2,409,356 | Hutchings | Oct. 15, 1946 |
| 2,413,606 | Colbert et al. | Dec. 31, 1946 |
| 2,428,868 | Dimmick | Oct. 14, 1947 |
| 2,475,921 | Smith | July 12, 1949 |